US012734724B2

(12) United States Patent
Randall et al.

(10) Patent No.: US 12,734,724 B2
(45) Date of Patent: Sep. 15, 2026

(54) AIR AND WATER BARRIER BUILDING PANELS

(71) Applicant: National Gypsum Properties, LLC, Charlotte, NC (US)

(72) Inventors: Brian G. Randall, Charlotte, NC (US); Joseph J. Bailey, Charlotte, NC (US); Eli Stav, Charlotte, NC (US); Brian Bland, Charlotte, NC (US); Gene Whittington, Indian Land, SC (US); R. G. Iyer, Fort Mill, SC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 0 days.

(21) Appl. No.: 15/996,983

(22) Filed: Jun. 4, 2018

(65) Prior Publication Data

US 2018/0345532 A1 Dec. 6, 2018

Related U.S. Application Data

(60) Provisional application No. 62/514,506, filed on Jun. 2, 2017.

(51) Int. Cl.

| | |
|---|---|
| ***B27N 3/06*** | (2006.01) |
| ***B27N 3/04*** | (2006.01) |
| ***B32B 13/00*** | (2006.01) |
| ***C03C 25/1025*** | (2018.01) |
| ***C04B 11/036*** | (2006.01) |
| ***C04B 28/14*** | (2006.01) |
| ***C04B 111/00*** | (2006.01) |
| ***C04B 111/27*** | (2006.01) |
| ***D21F 13/00*** | (2006.01) |
| ***E04C 2/06*** | (2006.01) |

(52) U.S. Cl.

CPC ................ *B27N 3/06* (2013.01); *B27N 3/04* (2013.01); *B32B 13/00* (2013.01); *C03C 25/1025* (2013.01); *C04B 11/036* (2013.01); *C04B 28/14* (2013.01); *C04B 28/145* (2013.01); *D21F 13/00* (2013.01); *E04C 2/06* (2013.01); *C04B 2111/00267* (2013.01); *C04B 2111/00275* (2013.01); *C04B 2111/00293* (2013.01); *C04B 2111/00405* (2013.01); *C04B 2111/00482* (2013.01); *C04B 2111/0062* (2013.01); *C04B 2111/27* (2013.01)

(58) Field of Classification Search

CPC .. B27N 3/06; B27N 3/04; B32B 13/00; C04B 28/14; C04B 11/036; C04B 28/145; C04B 2111/00275; C04B 2111/27; C04B 2111/00293; C04B 2111/00405; C04B 2111/00267; C04B 2111/0062; C04B 2111/00482; D21F 13/00; C03C 25/1025; E04C 2/06

See application file for complete search history.

(56) References Cited

U.S. PATENT DOCUMENTS

| | | | | |
|---|---|---|---|---|
| 2,273,967 | A | | 2/1942 | Leech |
| 3,289,371 | A | | 12/1966 | Pearson et al. |
| 3,383,271 | A | * | 5/1968 | Roberts ............... C04B 41/5007 428/70 |
| 3,944,698 | A | | 3/1976 | Dierks et al. |
| 3,993,822 | A | | 11/1976 | Knauf et al. |
| 4,195,110 | A | | 3/1980 | Dierks et al. |
| 4,204,030 | A | * | 5/1980 | Takamizawa .......... D21H 17/59 162/164.4 |
| 4,265,979 | A | | 5/1981 | Baehr et al. |
| 4,282,119 | A | | 8/1981 | Tinkelenberg et al. |
| 4,378,405 | A | | 3/1983 | Pilgrim |
| 4,394,411 | A | | 7/1983 | Kruell et al. |
| 4,421,704 | A | | 12/1983 | Reily |
| 4,467,496 | A | | 8/1984 | Gregg |
| 4,477,300 | A | | 10/1984 | Pilgrim |
| 4,504,533 | A | | 3/1985 | Altenhoefer et al. |
| 4,647,496 | A | | 3/1987 | Lehnert et al. |
| 4,784,897 | A | | 11/1988 | Brands et al. |
| 4,810,569 | A | | 3/1989 | Lehnert et al. |
| 4,879,173 | A | | 11/1989 | Randall |
| 5,112,678 | A | | 5/1992 | Gay et al. |
| 5,135,805 | A | * | 8/1992 | Sellers .................... C04B 24/42 106/781 |
| 5,148,645 | A | | 9/1992 | Lehnert et al. |
| 5,220,762 | A | | 6/1993 | Lehnert et al. |
| 5,319,900 | A | | 6/1994 | Lehnert et al. |
| 5,334,648 | A | | 8/1994 | Drews et al. |
| 5,342,680 | A | | 8/1994 | Randall |

(Continued)

FOREIGN PATENT DOCUMENTS

| | | |
|---|---|---|
| CA | 993779 | 7/1976 |
| DE | 3508933 | 10/1986 |

(Continued)

OTHER PUBLICATIONS

Dow Corning, “Dow Corning® MH 1107 Fluid”, Oct. 16, 2006. (Year: 2006).*

(Continued)

*Primary Examiner* — Christopher W Raimund

(74) *Attorney, Agent, or Firm* — Dority & Manning, P.A.

(57) ABSTRACT

A method for improving the air and/or water barrier performance of a building panel is disclosed. The building panel may be a gypsum board or cement board. In particular, the board may have improved resistance to bulk water penetration or permeation while maintaining breathability with respect to water vapor.

21 Claims, No Drawings

(56) References Cited

U.S. PATENT DOCUMENTS 5,371,989 A 12/1994 Lehnert et al.
5,389,716 A 2/1995 Graves et al.
5,397,631 A 3/1995 Green et al.
5,484,653 A 1/1996 Kennedy et al.
5,520,997 A 5/1996 Pourahmady et al.
5,552,187 A 9/1996 Green et al.
5,612,405 A 3/1997 Bainbridge et al.
5,644,880 A 7/1997 Lehnert et al.
5,685,903 A 11/1997 Stav et al.
5,704,179 A 1/1998 Lehnert et al.
5,718,759 A 2/1998 Stav et al.
5,718,785 A 2/1998 Randall
5,772,846 A 6/1998 Jaffee
5,791,109 A 8/1998 Lehnert et al.
5,840,413 A 11/1998 Kajander
5,851,933 A 12/1998 Swartz et al.
5,858,083 A 1/1999 Stav et al.
5,883,024 A 3/1999 Currier et al.
5,914,365 A 6/1999 Chang et al.
5,965,257 A 10/1999 Ahluwalia
5,965,638 A 10/1999 Heine
5,981,406 A 11/1999 Randall
6,001,496 A 12/1999 O'Haver-Smith
6,008,147 A 12/1999 Jaffee
6,071,994 A 6/2000 Hummerich et al.
6,077,883 A 6/2000 Taylor et al.
6,084,021 A 7/2000 Chang et al.
6,187,697 B1 2/2001 Jaffee et al.
6,197,107 B1 3/2001 Stav et al.
6,323,268 B1* 11/2001 Fisher ................ C04B 41/4961 524/588
6,331,350 B1 12/2001 Taylor et al.
6,384,116 B1 5/2002 Chan et al.
6,403,163 B1* 6/2002 Fisher ................ C04B 40/0039 427/387
6,406,779 B1 6/2002 Carbo et al.
6,524,679 B2 2/2003 Hauber et al.
6,544,911 B2 4/2003 Peng et al.
6,642,299 B2 11/2003 Wertz et al.
6,723,670 B2 4/2004 Kajander et al.
6,737,156 B2 5/2004 Koval et al.
6,746,781 B2 6/2004 Francis et al.
6,770,354 B2 8/2004 Randall et al.
6,808,793 B2 10/2004 Randall et al.
6,818,694 B2 11/2004 Hindi et al.
6,858,550 B2 2/2005 Ahluwalia
6,878,321 B2 4/2005 Hauber et al.
6,906,132 B2 6/2005 Belmares et al.
7,049,251 B2 5/2006 Porter et al.
7,060,639 B1 6/2006 Walters et al.
7,067,579 B2 6/2006 Taylor et al.
7,138,346 B2 11/2006 Bush et al.
7,199,179 B2 4/2007 Clamen et al.
7,217,671 B1 5/2007 Xing et al.
7,268,091 B2 9/2007 Xing et al.
7,272,915 B2 9/2007 Peng
7,300,515 B2 11/2007 Porter
7,300,892 B2 11/2007 Porter
7,384,514 B2 6/2008 Walters et al.
7,384,881 B2 6/2008 Miller et al.
7,387,704 B2 6/2008 Walters et al.
7,429,544 B2 9/2008 Grove et al.
7,455,909 B2 11/2008 Stanislawczyk et al.
7,547,375 B2 6/2009 Jaffee et al.
7,553,780 B2 6/2009 Smith
7,635,657 B2 12/2009 Bland et al.
7,645,490 B2 1/2010 Bush et al.
7,700,505 B2 4/2010 Leclercq et al.
7,745,357 B2 6/2010 Smith et al.
7,749,928 B2 7/2010 Smith et al.
7,807,592 B2 10/2010 Bland et al.
7,932,193 B2 4/2011 Kajander
7,932,195 B2 4/2011 Smith et al.
7,989,370 B2 8/2011 Currier et al.
8,070,895 B2 12/2011 Engbrecht et al.
8,092,858 B2 1/2012 Smith
8,257,524 B2 9/2012 Frank
8,409,391 B2 4/2013 Hauber et al.
8,461,067 B2 6/2013 Smith et al.
8,486,516 B2 7/2013 College
8,568,544 B2 10/2013 Engbrecht et al.
8,821,685 B2 9/2014 Frank
9,096,036 B2 8/2015 Hauber et al.
9,259,888 B2 2/2016 Hauber et al.
9,346,244 B2 5/2016 Hauber et al.
9,453,140 B2 9/2016 Varagnat et al.
9,486,980 B2 11/2016 Hauber et al.
9,739,059 B2 8/2017 Thomas et al.
9,758,965 B2 9/2017 Frank
9,840,843 B2 12/2017 Li et al.
9,869,089 B2 1/2018 Thomas et al.
9,879,426 B2 1/2018 Tilford
9,885,179 B2 2/2018 Hauber et al.
10,060,058 B2 8/2018 Teng et al.
10,077,552 B2 9/2018 Thomas et al.
10,155,360 B2 12/2018 Harrison et al.
10,179,997 B2 1/2019 Thomas et al.
10,207,475 B2 2/2019 Shake et al.
10,272,641 B2 4/2019 Li et al.
10,336,036 B2 7/2019 Dubey et al.
10,344,478 B2 7/2019 Foster et al.
10,400,452 B2 9/2019 Harrison et al.
10,407,907 B2 9/2019 Thomas et al.
2002/0155282 A1 10/2002 Randall et al.
2003/0129903 A1 7/2003 Moes
2003/0175478 A1 9/2003 Leclercq
2004/0038065 A1* 2/2004 Francis .................. B32B 13/04 156/39
2004/0170873 A1* 9/2004 Smith ..................... B32B 13/14 428/703
2004/0209074 A1 10/2004 Randall et al.
2004/0266303 A1 12/2004 Jaffee
2005/0159057 A1 7/2005 Hauber et al.
2005/0181693 A1 8/2005 Kajander et al.
2005/0202742 A1* 9/2005 Smith ................ B28B 19/0092 442/256
2005/0211500 A1 9/2005 Wendt et al.
2005/0266225 A1 12/2005 Currier et al.
2006/0240236 A1 10/2006 Bland et al.
2008/0175997 A1 7/2008 Goldstein et al.
2008/0176050 A1* 7/2008 Lintz ...................... C04B 41/63 428/213
2008/0190062 A1* 8/2008 Engbrecht .............. B32B 13/14 52/408
2008/0214716 A1 9/2008 Weiss et al.
2008/0274292 A1 11/2008 Shooshtari et al.
2009/0029141 A1 1/2009 Shake et al.
2009/0084514 A1 4/2009 Smith et al.
2009/0087616 A1 4/2009 Hennis et al.
2009/0124151 A1 5/2009 Shoemake et al.
2009/0173423 A1 7/2009 Jaffee
2009/0208714 A1 8/2009 Currier et al.
2009/0275250 A1 11/2009 Smith et al.
2009/0297865 A1 12/2009 Hauber et al.
2010/0040832 A1 2/2010 Herbert
2010/0143682 A1 6/2010 Shake et al.
2010/0186870 A1* 7/2010 Stuart .................... C04B 28/14 106/661
2010/0221524 A1 9/2010 Smith et al.
2010/0227137 A1* 9/2010 Smith ................ B28B 23/0006 428/218
2011/0030453 A1 2/2011 Shake et al.
2012/0076983 A1 3/2012 Yu et al.
2012/0082858 A1 4/2012 Przybysz et al.
2012/0132851 A1 5/2012 Blanchard et al.
2013/0115447 A1 5/2013 Blanchard et al.
2013/0157028 A1 6/2013 Blanchard et al.
2013/0316163 A1* 11/2013 Kumar ................... B32B 13/04 428/312.4
2014/0113123 A1 4/2014 Chuda et al.
2014/0261954 A1 9/2014 Dubey et al.
2014/0272402 A1* 9/2014 Dubey ................... B32B 13/14 428/339

(56) References Cited

U.S. PATENT DOCUMENTS

2014/0272404 A1 9/2014 Shake et al.
2014/0315008 A1* 10/2014 Francis ............... C04B 38/0067 156/45
2015/0064433 A1 3/2015 Foster et al.
2015/0197034 A1 7/2015 Hauber et al.
2015/0240492 A1 8/2015 Teng et al.
2015/0291844 A1* 10/2015 Blackburn ............. C04B 41/49 428/447
2016/0052168 A1 2/2016 Li et al.
2016/0052248 A1 2/2016 Hauber et al.
2016/0069070 A1 3/2016 Li
2016/0208439 A1 7/2016 Lelogeay
2016/0222656 A1 8/2016 Teng et al.
2016/0264461 A1* 9/2016 Peng .................. C04B 41/4876
2017/0197379 A1 7/2017 Teng et al.
2017/0282510 A1 10/2017 Peet et al.
2017/0284093 A1 10/2017 Lai et al.
2017/0326840 A1 11/2017 Shake et al.
2017/0341337 A1* 11/2017 Kirkwood ............... B32B 13/14
2018/0038101 A1 2/2018 Teng et al.
2018/0079106 A1 3/2018 Hauber et al.
2018/0187416 A1 7/2018 Hauber et al.
2019/0010697 A1 1/2019 Thomas et al.
2019/0105875 A1 4/2019 Harrison et al.

FOREIGN PATENT DOCUMENTS

GB 772581 4/1957
GB 1250713 10/1971
GB 2013563 8/1979

OTHER PUBLICATIONS

Power Chemical, “SiSiB® PF 2020 Fluid”, Power Chemical Corp. Ltd., 2008. (Year: 2008).*

* cited by examiner

AIR AND WATER BARRIER BUILDING PANELS

CROSS-REFERENCE TO RELATED APPLICATION

The present application claims filing benefit of U.S. Provisional Patent Application Ser. No. 62/514,506 having a filing date of Jun. 2, 2017, and which is incorporated herein by reference in its entirety.

BACKGROUND

Water penetration into and through building panels is an area of major concern in the building and construction industry. Typically, when bulk water penetrates through, such penetration can result in the formation of mold and mildew, which can lead to various health conditions and also a deterioration of the building panels. For instance, the composition of the panels may become dissolved in the wet environment, the panel itself may crack due to freeze-thaw cycles, and/or the facing material may separate from the panel over time. As a result, there remains the desire to create building panels, such as gypsum boards and cementitious boards, that have improved moisture management and performance capabilities. In addition, there also remains a desire to maintain or increase the breathability of the panel to allow the release of moisture in the form of water vapor to, for example, control the indoor air environment and reduce the risk of mold growth. While certain mechanisms have been employed to address such issues, there is always a need for an improved mechanism for providing a building panel with an improved air and water barrier performance.

Therefore, there is the need for building panels having improved air and water barrier properties that reduce the infiltration or penetration of bulk moisture but are breathable to allow the release of water vapor.

SUMMARY OF THE INVENTION

In accordance with one embodiment of the present invention, a method for improving the air and water barrier performance of a building panel is provided. The method comprises the following: providing a first facing material, providing a board slurry on the first facing material, providing a second facing material on the board slurry, and providing a hydrophobic material to the first facing material, the second facing material, or both.

In accordance with another embodiment of the present invention, a method for improving the bond between a facing material and a board core is provided. The method comprises the following: providing a first facing material, providing a board slurry on the first facing material, providing a second facing material on the board slurry, and providing a wetting agent to the first facing material, the second facing material, or both wherein the wetting agent is provided on a side of the facing material adjacent the board slurry.

In accordance with another embodiment of the present invention, a method for increasing the density of a board slurry adjacent a facing material is provided. The method comprises the following: providing a first facing material, providing a gypsum slurry on the first facing material, providing a second facing material on the gypsum slurry, and providing a defoaming agent at an interface between the gypsum slurry and the first facing material, the second facing material, or both.

In accordance with another embodiment of the present invention, a method for minimizing the presence of air voids between a facing material and a gypsum core is provided. The method comprises the following: providing a first facing material, providing a gypsum slurry on the first facing material, providing a second facing material on the gypsum slurry, and applying a vacuum across the surface of the first facing material, the second facing material, or both.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a building panel having improved air and water barrier performance and also a method of making such a panel. The present inventors have discovered various techniques and mechanisms that either individually or in combination can provide a building panel having improved air and water barrier performance. In particular, the building panels may prevent or inhibit the penetration of bulk water through the panel while still exhibiting breathability and allowing for the release of water vapor through the panel. In particular, the present inventors have discovered various techniques and mechanisms that allow for the management of moisture at various parts of the building panel (e.g., surface of a facer material, facer/core interface, etc.). The present inventors have discovered that providing such a building panel can allow for the inhibition and/or prevention of the formation of mold and mildew.

As used herein, the building panels may be any as generally known in the art. For instance, the building panel may be a gypsum board or a cement board. In one embodiment, the building panel is a gypsum board. In another embodiment, the building panel is a cement board.

In addition, the building panel may be an interior building panel or an exterior building panel. For instance, the building panel may be an exterior building panel such that it is on the exterior of a building structure. Alternatively, the building panel may be an interior building panel such that it is on the interior of a building structure. In one embodiment, the building panel is an exterior building panel. In another embodiment, the building panel is an interior building panel.

In general, methods for manufacturing these building panels are well known in the art. For instance, a gypsum board comprises a gypsum core sandwiched between two cover sheets of facing material or "facers." The gypsum core is produced from a gypsum slurry that is a mixture of dry and wet ingredients. The dry ingredients include calcium sulfate hemihydrate (stucco) and may include one or more additives that are known in the art, such as fiberglass, set accelerators, fillers (e.g., vermiculite), crystal modifiers (e.g., boric acid), and/or binders (e.g., starch). The wet ingredients include water and may include one or more additional components that are known in the art, such as paper pulp, potash, dispersants, set retarders, polymers, wax emulsion, silicone, surfactants, strengthening agents, mold inhibitors, and thickening agents. Additional "gauging water" may be added to the gypsum slurry to achieve the desired flowability of the slurry. An aqueous foam may be added to enhance the fluidity of the gypsum slurry and control the core density and weight of the gypsum board. The dry ingredients, wet ingredients, and/or gauging water are combined in a mixer (e.g., a pin mixer) to form the gypsum slurry, wherein the output can be to a canister and discharged through an outlet chute or "boot." The aqueous foam may be added to the gypsum slurry in the mixer or in the canister where additional mixing may occur.

The boot spreads the gypsum slurry onto a moving, continuous sheet of bottom (typically front) facing material that is conveyed (e.g, on a conveyor) in a production line. A moving, continuous sheet of top (typically back) facing material is placed on the gypsum slurry to sandwich the slurry between the top and bottom facing materials and form the board. The facers may be any as generally employed in the art, including paper or a woven or nonwoven web of fibers, such as a fiberglass mat, or other facing materials as known in the art. In one embodiment, the facers include paper. In another embodiment, the facers include a fiberglass mat. In a further embodiment, at least one facer includes a fiberglass mat while the other facer includes paper.

The board passes through a forming station which shapes the board into the desired thickness and width. The board stiffens and "sets" as the stucco and water rapidly undergo a rehydration reaction, in which the calcium sulfate hemihydrate is hydrated to form crystals of calcium sulfate dihydrate. The boards are then cut to a desired length and dried in a continuous kiln to evaporate excess (free) water.

In addition, cement board similarly comprises a cementitious core that is sandwiched between sheets of a mesh web that is typically made of fiberglass, polymer fibers, and/or other materials known in the art. The core is produced from a mixture comprising water, a hydraulic cement binder, and one or more aggregate materials. Common cement binders include Portland cement, magnesia cement, alumina cement, a pozzolan such as fly ash or blast furnace slag, gypsum, and other cementitious materials known in the art. Common aggregates include sand, stone, crushed stone, limestone, shale, clay, recycled concrete, granite, and other aggregate materials known in the art. The core mix may also include various additives that are known in the art, including retarders or accelerators, rheology modifiers, solid or hollow beads, spheres, or capsules, polymers, and natural or synthetic fibers to provide reinforcement and core integrity. Surfactants may also be added to introduce (microscopic) air bubbles into the core, as is known in the art.

Typically, a cementitious slurry comprising water and a cementitious material (e.g., the hydraulic cement of the core mix) is applied onto a fiberglass mesh web, such that at least a portion of the mesh web is embedded in the slurry. The core mix is dispensed onto the fiberglass mesh web from a holding container that commonly includes an agitator and controllable outlet member. A second fiberglass mesh web is overlaid on the cementitious core mix layer, to sandwich the cementitious core between the mesh webs and form the board. The second mesh web may be urged into the core mix, such that at least a portion of the mesh web is embedded into the core mix layer. The board is shaped and finished, cured (e.g., in a curing oven), and then cut to size.

In this regard, the present disclosure may include a method of making a board (e.g., gypsum board or cement board) that comprises the following steps: providing a board slurry (e.g., gypsum slurry or cement slurry) and providing a first facing material and a second facing material wherein the board slurry is provided between the first facing material and the second facing material to sandwich the slurry between the facing materials. In particular, a first facing material may be first provided and thereafter a board slurry may be provided onto the first facing material. Then, a second facing material may be provided onto the board slurry. The slurry can be used to form the board core (e.g., gypsum core or cement core).

Regardless of the type of building panel, whether a gypsum board or a cement board, it is desired to improve the air and water barrier performance of each board. The present inventors have discovered various techniques that may be employed for improving such performance. These techniques include improving the penetration of the gypsum slurry into the facing material and the embedment of the facing material into the gypsum core, improving the moisture management properties of the facing material, and/or improving the moisture management properties of the gypsum core. While techniques may be mentioned below with respect to one type building panel, it should be understood that such techniques may also be utilized with respect to other types of building panels.

One such technique for improving the air and water barrier performance is to remove or minimize the presence of air voids between the facer of a gypsum board and the gypsum core. When air voids are present, the voids can create spaces or channels that reduce the moisture management properties of the panel by allowing bulk water penetration into the facing material and subsequently the facing material-core (gypsum or cement) interface. In addition, by reducing or minimizing the air voids, this can also allow for proper attachment of the facer to the gypsum core.

One method for reducing the air voids at the interface is by improving the penetration of the gypsum slurry into the facing material and/or embedment of the facing material into the gypsum core. In one particular embodiment, such reduction is by improving the penetration of the gypsum slurry into the facing material, in particular when the facing material includes a matrix of fibers such as a fiberglass mat or mesh.

One method for improving the penetration of the gypsum slurry into the facing material can be via vacuum densification. In particular, as the board with the core and facing material travels along a production line, a vacuum gradient is applied across the surface of a facing material. In general, the vacuum increases the penetration of the board slurry, such as the gypsum slurry or cement slurry, into the spaces within the matrix of the facing material thereby reducing the voids in the gypsum slurry and facing material.

In one embodiment, a vacuum is applied on the facing material that comprises the face of the board. In another embodiment, a vacuum is applied on the facing material that comprises the back of the board. In a further embodiment, a vacuum is applied on both facing materials.

Further, the vacuum may be applied on the facing material that comprises the face of the board between depositing the board slurry and sandwiching by application of the second facing material. In another embodiment, vacuum may be applied to a facing material after application of the second facing material and before cutting of the board. Such vacuum may be applied to the facing material that comprises the face. Alternatively, such vacuum may be applied to the facing material that comprises the back. Or, vacuum may be applied to both facing materials. Generally, vacuum is applied before the board is fully set and cured thereby allowing for removal of the air voids.

In general, the vacuum may be about 5 mm Hg or more, such as 10 mm Hg or more, such as 15 mm Hg or more, such as 20 mm Hg or more, such as 25 mm Hg or more, such as 30 mm Hg or more, such as 35 mm Hg or more, such as 40 mm Hg or more, such as 50 mm Hg or more. The vacuum may be 100 mmH or less, such as 80 mm Hg or less, such as 70 mmHg or less, such as 60 mm Hg or less, such as 50 mm Hg or less, such as 40 mm Hg or less, such as 30 mm Hg or less.

Another method for reducing the air voids and improving the mat to core bond/embedment is to employ a wetting agent. Without intending to be limited by theory, it is believed that the wetting agent can reduce the surface tension of the facing material and/or board slurry. In this regard, the wetting agent may be presented in or on the facing material. In one particular embodiment, the facing material is applied at the interface of the board slurry and facing material.

In general, these wetting agents include, but are not limited to, general dispersants such as sulfonates (e.g., naphthalene sulfonates, lignosulfonates, and melamine sulfonates), polycarboxylates, polyacrylamides, etc. These wetting agents may typically include those components that can improve the wetting properties by reducing the surface tension of the water. In particular, these may include non-ionic surfactants, which can include ethoxylates (e.g., alkylphenol ethoxylates such as nonylphenol and/or octylphenol ethoxylates, primary alcohol ethoxylates, secondary alcohol ethoxylates), seed oil based nonionic surfactants, ethylene oxide/propylene oxide copolymers, and mixtures thereof. In addition, the wetting agent may be one that is non-foaming.

When the facing material includes the wetting agent, the wetting agent may be provided during the actual formation of the facing material. Alternatively, when applied as a coating, the wetting agent may be applied to a surface of the facing material in the form of a solution, dispersion, or suspension. In addition, the wetting agent may be provided such that it penetrates the facing material itself. In this regard, the wetting agent may be present as a coating and/or within a certain penetration depth into the facing material. For instance, the wetting agent may be present within 5%, such as within 10%, such as within 15%, such as within 20%, such as within 25% of the depth of the facing material.

In this regard, the wetting agent may be applied by coating, misting, spraying, foaming, or any other method generally employed in the art. When applied, the wetting agent may be applied on one side of the facing material and in particular, only on one side of the facing material. In this regard, the wetting agent may be on the side that bonds with the board slurry and core.

In addition, the facing material that comprises the face may include the wetting agent. Alternatively, the facing material that comprises the back may include the wetting agent. In a further embodiment, both facing materials may include the wetting agent.

The wetting agent may be present in an amount of 0.01 wt. % or more, such as 0.1 wt. % or more, such as 0.2 wt. % or more, such as 0.3 wt. % or more, such as 0.5 wt. % or more, such as 1 wt. % or more, such as 2 wt. % or more, such as 3 wt. % or more, based on the weight of the facing material. The wetting agent may be present in an amount of 10 wt. % or less, such as 8 wt. % or less, such as 7 wt. % or less, such as 6 wt. % or less, such as 5 wt. % or less, such as 4 wt. % or less, such as 3 wt. % or less, such as 2 wt. % or less, such as 1 wt. % or less based on the weight of the facing material.

In one embodiment, the wetting agent may be provided in the board slurry. When present in the board slurry, the wetting agent may be present in an amount of 0.01 wt. % or more, such as 0.1 wt. % or more, such as 0.2 wt. % or more, such as 0.3 wt. % or more, such as 0.5 wt. % or more, such as 1 wt. % or more, such as 2 wt. % or more, such as 3 wt. % or more, based on the weight of the board slurry. The wetting agent may be present in an amount of 10 wt. % or less, such as 8 wt. % or less, such as 7 wt. % or less, such as 6 wt. % or less, such as 5 wt. % or less, such as 4 wt. % or less, such as 3 wt. % or less, such as 2 wt. % or less, such as 1 wt. % or less based on the weight of the board slurry. The aforementioned concentrations may also apply for the concentration of the wetting agent within the board core.

While it was mentioned above that the facing material may be treated with a wetting agent to improve the mat to core embedment and/or bond, in another embodiment, the facing material may be treated with a hydrophobic material to increase the hydrophobicity of the facing material. In particular, the outer side or exterior side of the facing material may be treated with a hydrophobic material to prevent the penetration or permeation of bulk water. In another embodiment, the core may be treated with a hydrophobic agent that migrates to the interface and/or the facer. In one embodiment, the exterior side of the facing material may be treated with a hydrophobic material while the interior side or inner side (e.g., the side that forms the bond with the board slurry and core) may be treated with a hydrophilic material.

In this regard, a coating and/or core additives may be applied to provide a hydrophobic facing material. In general, without intending to be limited by theory, the hydrophobic nature of the facing material may prevent or inhibit the permeation or penetration of bulk water through the facing material and into the board.

In general, these hydrophobic materials include, but are not limited to, stearates (e.g., zinc stearate, calcium stearate, aluminum stearate), vinyl versatate, vinyl acetate, polyvinyl alcohol, polyvinyl acetate, metallic resonates, wax or asphalt or mixtures thereof, cornflower and potassium permanganate, water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogenpolysiloxanes; a wax-asphalt emulsion with or without such materials as potassium sulfate, alkali and alkaline earth aluminates, and portland cement; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product. Other hydrophobic materials include waxes, oils, styrene-acrylic polymers, H-siloxane used in conjunction with materials containing a hydroxyl group such as Ordinary Portland Cement (OPC), lime, calcined clay, metal earth oxides, and metal hydroxides. In one embodiment, Portland cement is utilized. In another embodiment, H-siloxane may be employed with a metal siliconate and/or combinations of the hydrophobic materials. Generally, these additives are combined to optimize curing (e.g., silicone curing) and resultant water resistance, preferably in a pH range of 8.5 to 9.2.

In one embodiment, the hydrophobic material may form a continuous barrier coating that also provides a physical barrier to moisture.

When applied as a coating, the hydrophobic material may be applied to a surface of the facing material in the form of a solution, dispersion, or suspension. In addition, the hydrophobic material may be provided such that it penetrates the facing material itself. In this regard, the hydrophobic material may be present as a coating and/or within a certain penetration depth into the facing material. For instance, the hydrophobic material may be present within 5%, such as within 10%, such as within 15%, such as within 20%, such as within 25% of the depth of the facing material.

In this regard, the hydrophobic material may be applied by coating, misting, spraying, foaming, or any other method generally employed in the art. When applied, the hydrophobic material may be applied on one side of the facing material and in particular, only on one side of the facing material. In this regard, the hydrophobic material may be on the exterior side which is the side opposite the side that bonds with the board slurry and core.

In addition, the facing material that comprises the face may include the hydrophobic material. Alternatively, the facing material that comprises the back may include the hydrophobic material. In a further embodiment, both facing materials may include the hydrophobic material.

The hydrophobic material may be present in an amount of 0.01 wt. % or more, such as 0.1 wt. % or more, such as 0.2 wt. % or more, such as 0.3 wt. % or more, such as 0.5 wt. % or more, such as 1 wt. % or more, such as 2 wt. % or more, such as 3 wt. % or more, based on the weight of the facing material. The hydrophobic material may be present in an amount of 10 wt. % or less, such as 8 wt. % or less, such as 7 wt. % or less, such as 6 wt. % or less, such as 5 wt. % or less, such as 4 wt. % or less based on the weight of the facing material.

As another method for inhibiting or preventing the permeation of bulk water and/or improving the permeation of water vapor, a polymer coating may be employed on the facing material. In particular, the outer side or exterior side of the facing material may be treated with the polymer coating to prevent the penetration or permeation of bulk water and/or improve the permeation of water vapor, such as from the interior of the structure to outside of the structure. In one embodiment, the exterior side of the facing material may be treated with a polymer coating while the interior side or inner side (e.g., the side that forms the bond with the board slurry and core) may be treated with a hydrophilic material.

In general, the polymeric coating may be formed from polymers that include, but are not limited to, hydrophobic polymers such as silicones and siloxanes. Others may include polytetrafluoroethylene and polyolefins (such as polyethylene and/or polypropylene). In this regard, such hydrophobic polymers may be the same as the hydrophobic materials mentioned above.

When applied as a coating, the polymeric coating may be applied to a surface of the facing material in the form of a solution, dispersion, or suspension. In addition, the polymeric coating may be provided such that it penetrates the facing material itself. In this regard, the polymeric coating may be present as a coating and/or within a certain penetration depth into the facing material.

In this regard, the polymeric coating may be applied by coating, misting, spraying, foaming, or any other method generally employed in the art. When applied, the polymeric coating may be applied on one side of the facing material and in particular, only on one side of the facing material. In this regard, the polymeric coating may be on the exterior side which is the side opposite the side that bonds with the board slurry and core.

However, in another embodiment, the polymeric coating may be provided directly on the core such that it is present at an interface between the board core and the facing material. In this regard, the polymeric coating may be either provided on the side of the facing material that bonds with the board core or may be applied on top of the board slurry and prior to providing the second facing material.

Similar to the above, the facing material may be employed comprising a laminate having multi-layers in order to provide different properties. For instance, the facing material may include two layers wherein an inner layer is adjacent or proximal to the board slurry and board core and an outer layer that is distal to the board slurry and board core. In general, the outer layer forms the outer surface of the board. Accordingly, the outer layer comprises a hydrophobic layer. In addition, the inner layer may comprise a hydrophilic layer. In this regard, the outer layer may inhibit or prevent bulk water permeation or penetration and/or increase water vapor permeation or penetration while the inner layer may be employed to improve the bond between the facing material and board slurry or board core. However, it should be understood that with a laminate, if the outer layer or inner layer is hydrophobic or hydrophilic, respectively, the other layer may also be provided as a conventional facing material or layer that is not hydrophobic or hydrophilic.

The outer hydrophobic layer may be any as generally known in the art. For instance, such outer layer may be formed of hydrophobic polymer fibers and/or have a hydrophobic coating (e.g., melamine coated paper). For example, the polymer may include a polyolefin (e.g., polyethylene, polypropylene, etc.). In addition, the hydrophobic coating may be derived from the hydrophobic materials mentioned above. These can also include silicones or siloxanes. In particular the hydrophobic materials may include polyalkylsiloxanes, such as polydialkylsiloxanes. In general, the alkyl may be a methyl, an ethyl, a propyl, a butyl, a pentyl, a hexyl, a heptyl, an ocytyl, or a nonyl group. In this regard, the alkyl may be a $C_1$-$C_9$ alkyl group, a $C_1$-$C_5$ alkyl group, a $C_1$-$C_3$ alkyl group, a $C_1$-$C_2$ alkyl group. However, it should be understood that even longer alkyl chains may be employed. In one particular embodiment, however, the alkyl group may be a methyl such that the siloxane is a polydimethylsiloxane.

The thickness of the laminate or multi-layer facing material may be similar to that of conventional facing materials.

In addition to manipulating the hydrophobicity of the facing material, the hydrophobicity of the board slurry may also be manipulated to improve the prevention or inhibition of bulk water permeation and/or improve the permeation or penetration of water vapor. When manipulating the hydrophobicity of the board slurry or core, any of the aforementioned hydrophobic materials or polymers may be employed.

Alternatively or in addition to manipulating the hydrophobicity of the board slurry, the density of the board slurry or board core may be increased in order to improve the prevention or inhibition of bulk water permeation and/or improve the permeation or penetration of water vapor. This approach may also provide the added benefit of improving the structural integrity of the board.

In one embodiment, the density of the gypsum board may be increased by defoaming. For example, the gypsum slurry may incorporate a defoaming agent as generally known in the art. These include, but are not limited to, a silicone, a siloxane, a polysiloxane, etc., or mixtures thereof. The defoaming agent may be added to the composition of the gypsum slurry, to one or more layers of the gypsum slurry that form the gypsum core, such as at the interface between the facing material and gypsum core, and/or to the portion of the gypsum slurry that forms the edges of the board.

In one embodiment, the defoaming action occurs at the interface of the core and facer such that the defoamer does not impact other parts of the core. In particular, the defoaming agent may be added at the location between the facer and the core to help densify the gypsum at the interface. In this regard, the core may include itself a broad face having an increase in density compared to the opposing broad face or the center of the core. Without intending to be limited by theory, such controlled defoaming can reduce liquid water penetration after board installation while reducing voids and also improving the facer embedment during board production.

The gypsum slurry may also be defoamed by incorporating board end trim, such as waste board. The incorporation of board end trim minimizes air bubbles and reduces core imperfections. In a preferred embodiment, the density of the gypsum board is increased at the facing material-gypsum core interface by roll coating the facing material with a defoamed gypsum slurry before it is introduced into the board production line, as is known in the art.

The following provides a further summary of the present claims. In one embodiment, a method for improving the air and water barrier performance of a building panel is provided. The method comprises the following: providing a first facing material, providing a board slurry on the first facing material, providing a second facing material on the board slurry, and providing a hydrophobic material to the first facing material, the second facing material, or both. The hydrophobic material can be applied to the second facing material after being placed on the board slurry wherein the hydrophobic material is applied on a side of the second facing material opposite a side adjacent the board slurry. The hydrophobic material can be applied to the first facing material prior to providing the first facing material wherein the hydrophobic material is applied on a side of the first facing material opposite a side adjacent the board slurry. The hydrophobic material can be provided in the board slurry which then migrates to the first facing material, the second facing material, or both. The hydrophobic material can include a polysiloxane. The hydrophobic material can comprise a polymer coating. The polymer can include a polytetrafluoroethylene or a polyolefin. The first facing material, the second facing material, or both can have hydrophobic properties and further wherein a hydrophilic facing material is positioned between the first facing material, the second facing material, or both and the board slurry.

In one embodiment, a method for improving the bond between a facing material and a board core is provided. The method comprises the following: providing a first facing material, providing a board slurry on the first facing material, providing a second facing material on the board slurry, and providing a wetting agent to the first facing material, the second facing material, or both wherein the wetting agent is provided on a side of the facing material adjacent the board slurry. The wetting agent can be applied at an interface between the second facing material and the board slurry after the board slurry is provided. The wetting agent can be applied at an interface between the first facing material and the board slurry before the board slurry is provided. The wetting agent can comprise a nonionic surfactant.

In one embodiment, a method for increasing the density of a board slurry adjacent a facing material is provided. The method comprises the following: providing a first facing material, providing a gypsum slurry on the first facing material, providing a second facing material on the gypsum slurry, and providing a defoaming agent at an interface between the gypsum slurry and the first facing material, the second facing material, or both. The defoaming agent can be applied at an interface between the first facing material and the board slurry before the board slurry is provided. The defoaming agent can be applied at an interface between the second facing material and the board slurry after the board slurry is provided. The defoaming agent can include a polysiloxane.

In one embodiment, a method for minimizing the presence of air voids between a facing material and a gypsum core is provided. The method comprises the following: providing a first facing material, providing a gypsum slurry on the first facing material, providing a second facing material on the gypsum slurry, and applying a vacuum across the surface of the first facing material, the second facing material, or both.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A method of making a gypsum panel having improved air and water barrier performance, the method comprising:

providing a first nonwoven facing material, providing a board slurry on the first nonwoven facing material, the board slurry comprising a binder, the binder comprising a starch, the board slurry penetrating the first nonwoven facing material, the board slurry forming a board core, the board core being free of polyvinyl alcohol, providing a second facing material on the board slurry, and applying a hydrophobic material to the first nonwoven facing material prior to providing the first nonwoven facing material, wherein the hydrophobic material is applied on a side of the first nonwoven facing material opposite a side adjacent the board slurry and forms a coating thereon, wherein the hydrophobic material penetrates the first nonwoven facing material, wherein the hydrophobic material is present in an amount of about 0.01 wt. % to about 10.0 wt. % based on the weight of the first nonwoven facing material and wherein the coating consists essentially of a polysiloxane comprising methylhydrogen polysiloxane or a polydialkylsiloxane, wherein the total amount of lignosulfonates in the board slurry is 0.1 wt. % or less.

2. The method of claim 1, wherein the hydrophobic material is further applied to the second facing material after being placed on the board slurry wherein the hydrophobic material is applied on a side of the second facing material opposite a side adjacent the board slurry.

3. The method of claim 1, wherein the hydrophobic material is further provided in the board slurry which then migrates to the first nonwoven facing material, the second facing material, or both.

4. The method of claim 1, wherein the hydrophobic material comprises methylhydrogen polysiloxane.

5. The method of claim 1, wherein the hydrophobic material comprises a polydialkylsiloxane.

6. The method of claim 1, wherein the hydrophobic material comprises polydimethylsiloxane.

7. The method of claim 1, wherein the first nonwoven facing material, the second facing material, or both have hydrophobic properties and further wherein a hydrophilic facing material is positioned between the first nonwoven facing material, the second facing material, or both and the board slurry.

8. The method of claim 1, wherein the first nonwoven facing material is a fiberglass mat facing material.

9. The method of claim 1, wherein the second facing material is a nonwoven facing material.

10. The method of claim 1, wherein the hydrophobic material is further provided in the board slurry which then migrates to the first nonwoven facing material, the second facing material, or both, wherein the hydrophobic material densifies the gypsum of the board slurry such that the board slurry has an increased density at the interface between the first nonwoven facing material and the board slurry, the density at the interface between the first nonwoven facing material and the board slurry being higher than the density of the center of the board slurry.

11. The method of claim 1, wherein the coating is the only coating present on the side of the first nonwoven facing material opposite the side adjacent the board slurry.

12. The method of claim 1, wherein the coating consists of the polysiloxane comprising methylhydrogen polysiloxane or the polydialkylsiloxane.

13. A method of making a gypsum panel having improved air and water barrier performance, the method comprising:

providing a first nonwoven facing material, providing a board slurry on the first nonwoven facing material, the board slurry forming a board core, the board core being free of polyvinyl alcohol, and providing a second facing material on the board slurry, wherein a hydrophobic material is applied to the first nonwoven facing material and forms a coating thereon, wherein the hydrophobic material is applied on a side of the first nonwoven facing material opposite a side adjacent the board slurry, wherein the hydrophobic material penetrates the first nonwoven facing material, wherein the hydrophobic material is present in an amount of about 0.01 wt. % to about 10.0 wt. % based on the weight of the first nonwoven facing material and wherein the coating consists essentially of a polysiloxane comprising methylhydrogen polysiloxane or a polydialkylsiloxane, wherein a polymeric coating is not applied on the side of the first nonwoven facing material adjacent the board slurry, wherein the application of the hydrophobic material to the first nonwoven facing material forms a hydrophobic facing material, wherein fly ash is not applied to form the hydrophobic facing material, wherein the total amount of lignosulfonates in the board slurry is 0.1 wt. % or less.

14. The method of claim 13, wherein the coating consists of the polysiloxane comprising methylhydrogen polysiloxane or the polydialkylsiloxane.

15. The method of claim 13, wherein the hydrophobic material is further provided in the board slurry which then migrates to the first nonwoven facing material, the second facing material, or both.

16. The method of claim 13, wherein the hydrophobic material comprises methylhydrogen polysiloxane.

17. The method of claim 13, wherein the hydrophobic material comprises a polydialkylsiloxane.

18. The method of claim 13, wherein the hydrophobic material comprises polydimethylsiloxane.

19. The method of claim 13, wherein the first nonwoven facing material, the second facing material, or both have hydrophobic properties and further wherein a hydrophilic facing material is positioned between the first nonwoven facing material, the second facing material, or both and the board slurry.

20. The method of claim 13, wherein the first nonwoven facing material is a fiberglass mat facing material.

21. The method of claim 13, wherein the hydrophobic material is further provided in the board slurry which then migrates to the first nonwoven facing material, the second facing material, or both, wherein the hydrophobic material densifies the gypsum of the board slurry such that the board slurry has an increased density at the interface between the first nonwoven facing material and the board slurry, the density at the interface between the first nonwoven facing material and the board slurry being higher than the density of the center of the board slurry.

* * * * *